United States Patent
Weidmann et al.

(10) Patent No.: US 10,745,322 B2
(45) Date of Patent: Aug. 18, 2020

(54) COPOLYMERS HAVING A GRADIENT STRUCTURE AS DISPERSANT FOR ALKALINICALLY ACTIVATED BINDING AGENTS

(71) Applicant: SIKA TECHNOLOGY AG, Baar (CH)

(72) Inventors: Jürg Weidmann, Winterthur (CH); Lukas Frunz, Dietlikon (CH); Jörg Zimmermann, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/762,866

(22) PCT Filed: Sep. 22, 2016

(86) PCT No.: PCT/EP2016/072549
§ 371 (c)(1),
(2) Date: Mar. 23, 2018

(87) PCT Pub. No.: WO2017/050900
PCT Pub. Date: Mar. 30, 2017

(65) Prior Publication Data
US 2018/0230051 A1    Aug. 16, 2018

(30) Foreign Application Priority Data
Sep. 24, 2015  (EP) .................................. 15186757

(51) Int. Cl.
*C04B 24/26* (2006.01)
*C04B 28/02* (2006.01)
*C04B 28/04* (2006.01)
*C04B 28/08* (2006.01)
*C04B 103/00* (2006.01)

(52) U.S. Cl.
CPC ...... *C04B 24/2641* (2013.01); *C04B 24/2605* (2013.01); *C04B 24/2652* (2013.01); *C04B 28/021* (2013.01); *C04B 28/04* (2013.01); *C04B 28/08* (2013.01); *C04B 2103/0063* (2013.01); *C04B 2103/0088* (2013.01)

(58) Field of Classification Search
CPC ............. C08F 293/005; C08F 2438/03; C04B 24/246; C04B 2103/408; C04B 2103/0061; C04B 2103/0063
See application file for complete search history.

(56) References Cited

U.S. PATENT DOCUMENTS

| | | | | |
|---|---|---|---|---|
| 4,842,649 A | * | 6/1989 | Heitzmann | C04B 24/26 106/706 |
| 4,962,173 A | * | 10/1990 | Kinoshita | C04B 24/26 528/15 |
| 5,661,206 A | * | 8/1997 | Tanaka | C04B 24/2647 524/376 |
| 2008/0196629 A1 | | 8/2008 | Yamakawa et al. | |
| 2012/0016059 A1 | * | 1/2012 | Faure | C04B 24/246 524/3 |
| 2013/0035417 A1 | * | 2/2013 | Villard | C04B 14/10 523/401 |
| 2013/0041073 A1 | * | 2/2013 | Villard | C04B 14/10 524/5 |
| 2014/0080943 A1 | | 3/2014 | Marchon et al. | |

FOREIGN PATENT DOCUMENTS

| | | |
|---|---|---|
| EP | 0 924 241 A2 | 6/1999 |
| EP | 1 110 981 A2 | 6/2001 |
| EP | 1 138 697 A1 | 10/2001 |
| WO | 2011/015780 A1 | 2/2011 |

OTHER PUBLICATIONS

Aitcin, P.-C.; High-Performance Concrete, 1998, p. 101-161.*
Zhang, J., et al.; Polymer Chemistry, 2013, vol. 4, p. 4639-4647.*
Pourchet, S., et al.; Cement and Concrete Research, 2012, vol. 42, p. 431-439.*
Mar. 27, 2018 International Preliminary Report on Patentability issued in International Patent Application No. PCT/EP2016/072549.
Dec. 15, 2016 International Search Report issued in International Patent Application No. PCT/EP2016/072549.
Colombian Office Action.
Apr. 30, 2019 Office Action issued in Thailand Application No. 1801001800.
Jan. 22, 2020 Office Action issued in Columbian Patent Application No. NC2018/0004247.
Feb. 18, 2020 Office Action issued in Brazilian Patent Application No. 112018005646.
Feb. 25, 2020 Office Action issued in Indian Patent Application No. 201817015000.
Apr. 29, 2020 Office Action issued in Indonesian Patent Application No. P00201802862.
May 20, 2020 Office Action issued in Chinese Patent Application No. 201680055482.8.

* cited by examiner

*Primary Examiner* — Robert S Jones
(74) *Attorney, Agent, or Firm* — Oliff PLC

(57) ABSTRACT

A copolymer as dispersant in a binder composition comprising an alkaline activating agent, wherein the activating agent is especially suitable for activation of a latently hydraulic and/or pozzolanic binder, wherein the copolymer has a polymer backbone and side chains bonded thereto and comprises at least one ionizable monomer unit M1 and at least one side chain-bearing monomer unit M2, and wherein the copolymer has a gradient structure in at least one section A in a direction along the polymer backbone with regard to the ionizable monomer unit M1 and/or with regard to the side chain-bearing monomer unit M2.

21 Claims, 1 Drawing Sheet

COPOLYMERS HAVING A GRADIENT STRUCTURE AS DISPERSANT FOR ALKALINICALLY ACTIVATED BINDING AGENTS

TECHNICAL FIELD

The invention relates to the use of a copolymer as dispersant in a binder composition comprising an alkaline activating agent. The invention further relates to a binder composition and to a process for production thereof. A further aspect of the invention relates to a shaped article obtainable from a binder composition.

PRIOR ART

The production of cement generates a considerable amount of $CO_2$, which is of relevance to the climate. In order to reduce $CO_2$ emissions, cement in binder compositions can be partly replaced by latently hydraulic and/or pozzolanic cement admixtures, for example fly ashes, slags or silica dust. Admixtures of this kind are by-products of various industrial processes and are therefore advantageous in relation to the $CO_2$ balance. However, the setting of cement admixtures of this kind, without additional measures, takes much longer than in the case of hydraulic cement. This is disadvantageous especially with regard to high early strengths of binder compositions. However, it is possible to activate latently hydraulic and pozzolanic admixtures, for example, by means of alkaline or basic activating agents.

In order to improve the workability of cementitious binder compositions with minimum water/binder ratio, it is additionally customary to use what are called dispersants as plasticizers. This achieves both good workability of the liquid binder composition and high mechanical strength after curing thereof. Known particularly effective dispersants are, for example, comb polymers based on polycarboxylate. Comb polymers of this kind have a polymer backbone and side chains bonded thereto. Corresponding polymers are described, for example, in EP 1 138 697 A1 (Sika AG).

Likewise known as concrete additives are copolymer mixtures as mentioned, for example, in EP 1 110 981 A2 (Kao). The copolymer mixtures are prepared by converting ethylenically unsaturated monomers in a free-radical polymerization reaction, wherein the molar ratio of the two monomers is altered at least once during the polymerization process.

As has been found, polycarboxylate-based comb polymers, however, are generally extremely sensitive to elevated basic conditions. If dispersants of this kind are used in binder compositions together with alkaline activating agents, they cease to have any effect after a short time.

There is therefore still a need for effective dispersants which are also usable in alkali-activated binder compositions.

SUMMARY OF THE INVENTION

It is therefore an object of the invention to provide dispersants in which the aforementioned drawbacks are overcome. The dispersants are to be usable especially in alkali-activated binder compositions and are to remain effective for as long as possible.

It has been found that, surprisingly, the object of the invention is achievable through use of a copolymer as claimed in claim 1.

The copolymer has a polymer backbone and side chains bonded thereto, and comprises at least one ionizable monomer unit M1 and at least one side chain-bearing monomer unit M2, the copolymer having a gradient structure in at least one section A in a direction along the polymer backbone with regard to the ionizable monomer unit M1 and/or with regard to the side chain-bearing monomer unit M2.

As has been found, the copolymers used in accordance with the invention, by comparison with conventional comb polymers having, for example, purely statistical (=random) or blockwise distributions of the monomer units, are surprisingly insensitive to alkaline conditions as exist, for example, in alkali-activated binder compositions comprising latently hydraulic and/or pozzolanic binders.

This is especially shown by the fact that the difference in the flowability of comb polymer-containing binder compositions that have been made up with and without alkaline activating agents is relatively small.

Thus, the copolymers of the invention having gradient structure, as dispersants or plasticizers, even in alkali-activated binder compositions, remain effective over a prolonged period and enable good workability with a low water/cement ratio.

The copolymers of the invention can thus be used in an advantageous manner, specifically for plasticization, for reduction of the water requirement and/or for improvement of the workability of mineral binder compositions comprising alkaline activating agents.

Further aspects of the invention are the subject of further independent claims. Particularly preferred embodiments of the invention are the subject of the dependent claims.

Ways of Executing the Invention

A first aspect of the present invention relates to the use of a copolymer as dispersant in a binder composition comprising an alkaline activating agent, wherein the activating agent is especially suitable for activation of a latently hydraulic and/or pozzolanic binder, wherein the copolymer has a polymer backbone and side chains bonded thereto and comprises at least one ionizable monomer unit M1 and at least one side chain-bearing monomer unit M2, and wherein the copolymer has a gradient structure in at least one section A in a direction along the polymer backbone with regard to the ionizable monomer unit M1 and/or with regard to the side chain-bearing monomer unit M2.

In other words, in the copolymer of the invention, there is a concentration gradient in at least one section A in a direction along the polymer backbone with regard to the ionizable monomer unit M1 and/or the side chain-bearing monomer unit M2.

The term "gradient structure" or "concentration gradient" in the present case is especially a continuous change in the local concentration of a monomer unit in at least one section in a direction along the copolymer backbone. Another term for "concentration gradient" is "concentration slope".

The concentration gradient may, for example, be essentially constant. This corresponds to a linear decrease or increase in the local concentration of the respective monomer unit in the at least one section A in the direction of the copolymer backbone. However, it is possible that the concentration gradient changes in the direction of the copolymer backbone. In this case, there is a nonlinear decrease or increase in the local concentration of the respective monomer unit. The concentration gradient extends especially over at least 10, especially at least 14, preferably at least 20 or at least 40, monomer units of the copolymer.

By contrast, abrupt or sharp changes in concentration of monomers as occur, for example, in the case of block copolymers are not referred to as a concentration gradient.

The expression "local concentration" in the present context refers to the concentration of a particular monomer at a given point in the polymer backbone. In practice, the local concentration or the mean of the local concentration can be ascertained, for example, by determining the monomer conversions during the preparation of the copolymer. In this case, the monomers converted within a particular period can be ascertained. The averaged local concentration especially corresponds to the ratio of the mole fraction of a particular monomer converted within the period of time in question to the total molar amount of the monomers converted within the period of time in question.

The conversions of the monomers can be determined in a manner known per se, for example, with the aid of liquid chromatography, especially high-performance liquid chromatography (HPLC), and taking account of the amounts of monomers used.

In particular, it is also possible to analyse and to determine the structure of the copolymers by nuclear spin resonance spectroscopy (NMR spectroscopy). By $^1$H and $^{13}$C NMR spectroscopy in particular, it is possible in a manner known per se to determine the sequence of the monomer units in the copolymer on the basis of neighboring group effects in the copolymer and using statistical evaluations.

The copolymer may also have more than one section A having a gradient structure, especially two, three, four or even more sections A, which are arranged in succession, for example. If present, different gradient structures or concentration slopes may each be present in the different sections A.

The terms "ionizable monomers" and "ionizable monomer units" especially mean monomers or polymerized monomers that are in anionic or negatively charged form at a pH>10, especially at a pH>12. These are especially H donor groups or acid groups. The ionizable groups are more preferably acid groups, for example carboxylic acid, sulfonic acid, phosphoric acid and/or phosphonic acid groups. Preference is given to carboxylic acid groups. The acid groups may also take the form of anions in deprotonated form or of a salt with a counterion or cation.

A "binder composition" in the present context is especially understood to mean a composition comprising at least one organic and/or mineral binder. The binder is preferably a mineral binder.

The "alkaline activating agent" is especially a basic or alkaline substance. This is especially understood to mean a substance which, on addition to an aqueous solution, is capable of raising the pH thereof. An alkaline activating agent is specifically understood to mean a substance suitable for activation of the setting or hardening of latently hydraulic and/or pozzolanic binders.

The binder composition is especially an activated binder composition or an alkali-activated binder composition which, as well as the binder, additionally comprises an alkaline activating agent. More particularly, the binder composition comprises an activating agent for activation of a latently hydraulic and/or pozzolanic binder. The alkali-activated binder composition especially has a higher pH than an analogous binder composition that has not been activated or does not contain any alkaline activating agent. The alkaline activating agent may be in free or dissolved form, for example in salt form, and/or may at least partly have reacted with the binder.

The expression "latently hydraulic and/or pozzolanic binders" is especially understood in the present context to mean binders which only hydraulically set or harden through the effect of additions or activating agents. More particularly, these are reactive admixtures, in particular reactive admixtures of type II according to standard EN 1045-2.

Preferably, the binder composition comprises or consists of a latently hydraulic and/or pozzolanic binder.

Possible latently hydraulic and/or pozzolanic binders are especially slags, pozzolans, fly ashes, silica dust, volcanic ashes, metakaolins, rice husks, burnt shale and/or calcined clay. Preferred latently hydraulic and/or pozzolanic binders include slags, pozzolans, fly ashes and/or silica dust, particular preference in the present context being given to fly ash. Slag is likewise advantageous.

The binder composition is especially a cementitious or cement-containing binder composition. A proportion of cement in the binder composition is especially at least 5% by weight, particularly 5-95% by weight, preferably 60-80% by weight. A suitable example of a cement is portland cement. However, it is also possible to use calcium aluminate cements, portland limestone cements and/or belite-rich sulfoaluminate cement.

In an advantageous embodiment, the binder composition especially includes 5-95% by weight, especially 15-50% by weight, more preferably 20-40% by weight, of latently hydraulic and/or pozzolanic binder, and 5-95% by weight, preferably 60-80% by weight, of hydraulic binder. The hydraulic binder is advantageously a cement, especially a portland cement.

The binder composition may, in addition to or instead of the aforementioned components, for example, also include other hydraulic binders, for example hydraulic lime. The binder composition may likewise also comprise nonhydraulic binders, for example gypsum, anhydrite and/or white lime.

Moreover, the binder composition may comprise inert substances, for example pigments, limestone or ground limestone. Especially in combination with latently hydraulic and/or pozzolanic binders. In this way, a portion of the latently hydraulic and/or pozzolanic binders can be replaced by inert substances, for example limestone. A proportion of the inert substances is especially 0.1-30% by weight, preferably 0.1-20% by weight, further preferably 0.1-15% by weight.

The activating agent advantageously comprises an alkali metal salt and/or alkaline earth metal salt. This is especially an alkali metal hydroxide, alkali metal carbonate and/or alkali metal sulfate. Preference is given to NaOH, KOH, Na$_2$CO$_3$ and/or Na$_2$SO$_4$. Particular preference is given to an alkali metal hydroxide and/or an alkali metal carbonate. More particularly, the activating agent is NaOH and/or Na$_2$CO$_3$, preferably NaOH.

Activating agents of this kind cause particularly significant activation of the latently hydraulic and pozzolanic binders, and are additionally compatible with the copolymers of the invention. Thus, high early strengths are achievable with simultaneously good workability of the binder compositions. In principle, however, other activating agents are also usable.

A concentration of the activating agent is advantageously 0.001-5% by weight, preferably 0.1-1.5% by weight, even further preferably 0.5-1.5% by weight, based in each case on the weight of the binder. The concentrations are especially based on the weight of the latently hydraulic and/or pozzolanic binder.

Preferably, in the at least one section A, a local concentration of the at least one ionizable monomer unit M1 increases continuously along the polymer backbone, while a local concentration of the at least one side chain-bearing monomer unit M2 decreases continuously along the polymer backbone, or vice versa.

A local concentration of the ionizable monomer unit M1 at the first end of the at least one section A is especially lower than at the second end of the section A, while a local concentration of the side chain-bearing monomer unit M2 at the first end of the section A is greater than at the second end of the section A, or vice versa.

More particularly, in the case of a division of the at least one section A into 10 subsections of equal length, the averaged local concentration of the at least one ionizable monomer unit M1 in the respective subsections along the polymer backbone increases in at least 3, especially in at least 5 or 8, successive subsections, while the averaged local concentration of the at least one side chain-bearing monomer unit M2 in the respective subsections along the polymer backbone decreases in at least 3, especially in at least 5 or 8, successive subsections, or vice versa.

Specifically, an increase or decrease in the averaged local concentration of the at least one ionizable monomer unit M1 in the successive subsections is essentially constant, while, advantageously, a decrease or increase in the averaged local concentration of the at least one side chain-bearing monomer unit M2 in the successive subsections is essentially likewise constant.

A weight-average molecular weight $M_w$ of the overall copolymer is especially in the range of 10'000-150'000 g/mol, advantageously 12'000-80'000 g/mol, especially 12'000-50'000 g/mol. In the present context, molecular weights such as the weight-average molecular weight $M_w$ or the number-average molecular weight $M_n$ are determined by gel permeation chromatography (GPC) with polyethylene glycol (PEG) as standard. This technique is known per se to the person skilled in the art.

In a preferred embodiment, the polydispersity (=weight-average molecular weight $M_w$/number-average molecular weight $M_n$) of the copolymer is <1.5. In particular, the polydispersity is in the range of 1.0-1.4, especially 1.1-1.3.

In an advantageous embodiment, the at least one section A having the gradient structure, based on a total length of the polymer backbone, has a length of at least 30%, especially at least 50%, preferably at least 75% or 90%.

Advantageously, the at least one section A, based on a total number of monomer units in the polymer backbone, has a proportion of at least 30%, especially at least 50%, preferably at least 75% or 90%, of monomer units.

In particular, the at least one section A, based on the weight-average molecular weight of the overall copolymer, has a proportion by weight of at least 30%, especially at least 50%, preferably at least 75% or 90%.

Thus, the section A with the concentration gradient or the gradient structure is of particular importance.

The at least one section A having the concentration gradient advantageously comprises 5-70, especially 7-40, preferably 10-25, monomer units M1 and 5-70, especially 7-40, preferably 10-25, monomer units M2.

More particularly, the copolymer consists to an extent of at least 50 mol %, in particular at least 75 mol %, especially at least 90 mol % or 95 mol %, of ionizable monomer units M1 and side chain-bearing monomer units M2.

It is advantageous when at least 30 mol %, especially at least 50 mol %, preferably at least 75 mol %, in particular at least 90 mol % or at least 95 mol %, of the ionizable monomer units M1 are in the at least one section A having a gradient structure.

Likewise advantageously, at least 30 mol %, especially at least 50 mol %, preferably at least 75 mol %, in particular at least 90 mol % or at least 95 mol %, of the side chain-bearing monomer units M2 are in the at least one section having a gradient structure.

Especially preferably, the two latter aforementioned conditions apply simultaneously.

In another advantageous embodiment, the copolymer, in addition to the at least one section A having a gradient structure, has a further section B, wherein there is essentially a constant local concentration of the monomers and/or a statistical or random distribution of the monomers over the entire section B. Section B may consist, for example, of a single kind of monomers or of multiple different monomers in statistical distribution. In section B, however, there is especially no gradient structure and no concentration gradient along the polymer backbone.

The copolymer may also have more than one further section B, for example two, three, four or even more sections B, which may differ from one another from a chemical and/or structural point of view.

Preferably, the at least one section A directly adjoins the further section B.

It has been found that, surprisingly, copolymers of this kind are even more advantageous under some circumstances with regard to the plasticizing effect and the maintenance thereof over time.

More particularly, the further section B comprises ionizable monomer units M1 and/or side chain-bearing monomer units M2.

Based on all the monomer units present therein, the further section B, in one embodiment of the invention, for example, comprises advantageously at least mol %, especially at least 50 mol %, preferably at least 75 mol %, in particular at least 90 mol % or at least 95 mol %, of ionizable monomer units M1. Any proportion of side chain-bearing monomer units M2 present in the further section B is particularly less than 25 mol %, especially less than 10 mol % or less than 5 mol %, based on all monomer units M1 in the further section. More particularly, there are no side chain-bearing monomer units M2 in the further section B.

In a further and particularly advantageous implementation of the invention, the further section B, based on all the monomer units present therein, comprises at least 30 mol %, especially at least 50 mol %, preferably at least 75 mol %, in particular at least 90 mol % or at least 95 mol %, of side chain-bearing monomer units M2. In this case, any proportion of ionizable monomer units M1 present in the further section B is in particular less than 25 mol %, especially less than mol % or less than 5 mol %, based on all monomer units M2 in the further section B. More particularly, there are no ionizable monomer units M1 in the further section B.

It has been found to be appropriate when the further section B comprises a total of 5-70, especially 7-40, preferably 10-25, monomer units. These are especially monomer units M1 and/or M2.

A ratio of the number of monomer units in the at least one section A having gradient structure to the number of monomer units in the at least one further section B having the essentially constant local concentration is advantageously in the range of 99:1-1:99, especially 10:90-90:10, preferably 80:20-20:80, especially 70:30-30:70.

The side chain-bearing monomer unit M2 especially includes polyalkylene oxide side chains, especially polyethylene oxide and/or polypropylene oxide side chains.

The ionizable monomer unit M1 preferably includes acid groups, especially carboxylic acid, sulfonic acid, phosphoric acid and/or phosphonic acid groups.

An especially preferred copolymer is one in which the ionizable monomer unit M1 has a structure of the formula I

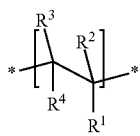

(I)

The side chain-bearing monomer unit M2 includes, in particular, a structure of the formula II

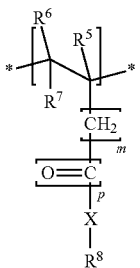

(II)

where
$R^1$, in each case independently, is —COOM, —$SO_2$—OM, —O—PO(OM)$_2$ and/or —PO(OM)$_2$,
$R^2$, $R^3$, $R^5$ and $R^6$, in each case independently, are H or an alkyl group having 1 to 5 carbon atoms,
$R^4$ and $R^7$, in each case independently, are H, —COOM or an alkyl group having 1 to 5 carbon atoms,
or where $R^1$ forms a ring together with $R^4$ to give —CO—O—CO—,
M, independently of one another, represents H+, an alkali metal ion, an alkaline earth metal ion, a di- or trivalent metal ion, an ammonium ion or an organic ammonium group;
m=0, 1 or 2,
p=0 or 1,
X, in each case independently, is —O— or —NH—,
$R^8$ is a group of the formula —[AO]$_n$—$R^a$
where A=$C_2$- to $C_4$-alkylene, $R^a$ is H, a $C_1$- to $C_{20}$-alkyl group, -cycloalkyl group or -alkylaryl group,
and n=2-250, especially 10-200.

Advantageously, a molar ratio of the ionizable monomer units M1 to the side chain-bearing monomer units M2 is in the range of 0.5-6, especially 0.7-4, preferably 0.9-3.8, further preferably 1.0-3.7 or 2-3.5. This achieves an optimal dispersing effect in mineral binder compositions.

In particular, $R^1$=COOM, $R^2$=H or $CH_3$, $R^3$=$R^4$=H. It is thus possible to prepare the copolymer on the basis of acrylic or methacrylic acid monomers, which is of interest from an economic point of view. Moreover, copolymers of this kind in the present context result in a particularly good dispersing effect.

Copolymers with $R^1$=COOM, $R^2$=H, $R^3$=H and $R^4$=COOM may likewise be advantageous. Such copolymers can be prepared on the basis of maleic acid monomers.

The X group in the ionizable monomer unit M2, advantageously in at least 75 mol %, particularly in at least 90 mol %, especially in at least 95 mol % or at least 99 mol % of all monomer units M2, is
—O— (=oxygen atom).

Advantageously, $R^5$=H or $CH_3$, $R^6$=$R^7$=H and X=—O—. It is thus possible to prepare copolymers of this kind, for example, proceeding from (meth)acrylic esters, vinyl ethers, (meth)allyl ethers or isoprenol ethers.

In a particularly advantageous embodiment, $R^2$ and $R^5$ are each mixtures of 40-60 mol % of H and 40-60 mol % of —$CH_3$.

In a further advantageous embodiment, $R^1$=COOM, $R^2$=H, $R^5$=
$CH_3$ and $R^3$=$R^4$=$R^6$=$R^7$=H.

In another advantageous embodiment, $R^1$=COOM, $R^2$=$R^5$=H or —$CH_3$ and $R^3$=$R^4$=$R^6$=$R^7$=H.

Especially advantageous copolymers are those in which: $R^1$=COOM; $R^2$ and $R^5$ are each independently H, —$CH_3$ or mixtures thereof; $R^3$ and $R^6$ are each independently H or —$CH_3$, preferably H; $R^4$ and $R^7$ are each independently H or —COOM, preferably H.

The $R^8$ radical in the side chain-bearing monomer unit M2, based on all the $R^8$ radicals in the copolymer, consists of a polyethylene oxide especially to an extent of at least 50 mol %, especially at least 75 mol %, preferably at least 95 mol % or at least 99 mol %. A proportion of ethylene oxide units based on all the alkylene oxide units in the copolymer is especially more than 75 mol %, especially more than 90 mol %, preferably more than 95 mol % and specifically 100 mol %.

More particularly, $R^8$ has essentially no hydrophobic groups, especially no alkylene oxides having three or more carbon atoms. This especially means that a proportion of alkylene oxides having three or more carbon atoms based on all the alkylene oxides is less than 5 mol %, especially less than 2 mol %, preferably less than 1 mol % or less than 0.1 mol %. In particular, there are no alkylene oxides having three or more carbon atoms or the proportion thereof is 0 mol %.

$R^a$ is advantageously H and/or a methyl group. Particularly advantageously, A=$C_2$-alkylene and $R^a$ is H or a methyl group.

More particularly, the parameter n=10-150, especially n=15-100, preferably n=17-70, specifically n=19-45 or n=20-25. In particular, this achieves excellent dispersing effects within the preferred ranges specified.

It may further be advantageous when the copolymer comprises at least one further monomer unit MS which especially differs chemically from the monomer units M1 and M2. In particular, multiple different further monomer units MS may be present. In this way, it is possible to further modify the properties of the copolymer and to adjust them, for example, with regard to specific applications.

Particularly advantageously, the at least one further monomer unit MS is a monomer unit of the formula III:

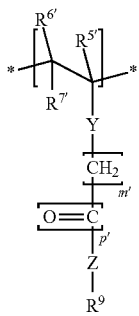

(III)

where
R$^{5'}$, R$^{6'}$, R$^{7'}$, m' and p' are as defined for R$^5$, R$^6$, R$^7$, m and p;
Y, in each case independently, is a chemical bond or —O—;
Z, in each case independently, is a chemical bond, —O— or —NH—;
R$^9$, in each case independently, is an alkyl group, cycloalkyl group, alkylaryl group, aryl group, hydroxyalkyl group or an acetoxyalkyl group, each having 1-20 carbon atoms.

Advantageous examples of further monomer units MS are those where m'=0, p'=0, Z and Y represent a chemical bond and R$^9$ is an alkylaryl group having 6-10 carbon atoms.

Also suitable are especially further monomer units MS in which m'=0, p'=1, Y is —O—, Z represents a chemical bond and R$^9$ is an alkyl group having 1-4 carbon atoms.

Further suitable are further monomer units MS where m'=0, p'=1, Y is a chemical bond, Z is —O— and R$^9$ is an alkyl group and/or a hydroxyalkyl group having 1-6 carbon atoms.

Particularly advantageously, the at least one further monomer unit MS consists of polymerized vinyl acetate, styrene and/or hydroxyalkyl (meth)acrylate, especially hydroxyethyl acrylate.

The at least one further monomer unit MS may be part of the at least one section A and/or of the further section B. It is also possible that the at least one further monomer unit MS is part of an additional section of the copolymer. More particularly, different monomer units MS may be present in the different sections.

If present in the at least one section A, the at least one further monomer unit MS advantageously has a proportion in the first section A of 0.001-80 mol %, preferably 20-75 mol %, especially 30-70 mol %, based on all the monomer units in the at least one section A.

If present in the further section B, the at least one further monomer unit MS especially has a proportion in the further section B of 0.001-80 mol %, preferably 20-75 mol %, especially 30-70 mol % or 50-70 mol %, based on all the monomer units in the further section B.

In an advantageous embodiment, the at least one further monomer unit MS is present in the at least one section A and/or in the further section B with a proportion of 20-75 mol %, especially 30-70 mol %, based on all monomer units in the respective section.

In an advantageous embodiment, the copolymer consists of the at least one section A. In another advantageous embodiment, the copolymer consists of the at least one section A and the further section B. The latter case in particular results in very good and long-lasting plasticizing effects.

However, it is also possible, for example, that the copolymer contains at least two different sections A and/or at least two different further sections B.

A particularly advantageous copolymer has at least one or more than one of the following features:
i) The copolymer consists to an extent of at least 75 mol %, especially at least 90 mol % or 95 mol %, of ionizable monomer units M1 and side chain-bearing monomer units M2;
ii) The copolymer comprises or consists of at least one section A and a further section B;
iii) The further section B comprises side chain-bearing monomer units M2, especially at least 50 mol %, preferably at least 75 mol %, in particular at least 90 mol % or at least 95 mol %, based on all the monomer units present in the section B. Any proportion of ionizable monomer units M1 present in the further section B is less than 25 mol %, especially less than mol % or less than 5 mol %, based on all monomer units M2 in the further section B.
iv) A molar ratio of the monomer units M1 to the monomer units M2 in the copolymer is in the range of 0.5-6, preferably 0.8-3.5;
(v) R$^1$ is COOM;
(vi) R$^2$ and R$^5$ are H or CH$_3$, preferably CH$_3$;
(vii) R$^3$=R$^4$=R$^6$=R$^7$=H;
(viii) m=0 and p=1;
(ix) X=—O—
(x) A=C$_2$-alkylene and n=10-150, preferably 15-50;
(xi) R$^a$=H or —CH$_3$, preferably CH$_3$.

An especially preferred copolymer is one consisting of sections A and B which has at least all the features (i)-(iv). Further preferred is a copolymer having all the features (i)-(xi). Even further preferred is a copolymer which fulfills all the features (i)-(xi) in the executions preferred in each case.

The copolymer is particularly a polymer having essentially linear structure. This particularly means that all monomer units of the copolymer are arranged in a single and/or unbranched polymer chain. Specifically, the copolymer does not have a star-shaped structure and/or the copolymer is not part of a branched polymer. More particularly, the copolymer is not part of a polymer in which there are multiple, especially three or more, polymer chains running in different directions attached to a central molecule.

The copolymer may be in liquid or solid form. More preferably, the copolymer is present as a constituent of a solution or dispersion, wherein a proportion of the copolymer is especially 10-90% by weight, preferably 25-65% by weight. This means that the copolymer can be added, for example, very efficiently to binder compositions. If the copolymer is being prepared in solution, especially in aqueous solution, it is additionally possible to dispense with further processing.

In accordance with another advantageous embodiment, the copolymer is in the solid state of matter, especially in the form of a powder, in the form of pellets and/or sheets. This especially simplifies the transport of the copolymers. Solutions or dispersions of the copolymers can be converted to the solid state of matter, for example, by spray-drying. The polymer used in accordance with the invention is especially obtainable by the process described below.

A further aspect of the present invention therefore relates to a process for preparing a copolymer, especially a copolymer as described above, wherein ionizable monomers m1 and side chain-bearing monomers m2 are polymerized together to form a concentration gradient and/or a gradient structure. The ionizable monomers m1, on completion of polymerization, correspond to the abovementioned ionizable monomer units M1 of the copolymer. The side chain-bearing monomers m2, on completion of polymerization, likewise correspond to the above-described side chain-bearing monomer units M2.

More particularly, during the polymerization, a molar ratio of free ionizable monomers m1 to free side chain-bearing monomers m2 is at least temporarily altered. Specifically, the alteration of the molar ratio includes a continuous alteration. It is thus possible to form, in an efficiently controllable manner, a concentration gradient or a gradient structure.

Optionally, in addition, there is a stepwise change in the molar ratio of the free ionizable monomers m1 to the free side chain-bearing monomers m2. Especially prior to conduction of the continuous alteration. In this way, for example, a copolymer having a further section B is obtainable.

In a preferred embodiment, in a first step a), a portion of the ionizable monomers m1 is converted or polymerized essentially in the absence of side chain-bearing monomers m2 and, after attainment of a predetermined conversion, in a second step b), the as yet unconverted ionizable monomers m1 are polymerized together with the side chain-bearing monomers m2. In this way, in a simple and inexpensive manner, a copolymer having a further section B consisting essentially of polymerized ionizable monomers m1 is preparable.

Likewise advantageously, in a first step a), a portion of the side chain-bearing monomers m2 is converted or polymerized essentially in the absence of ionizable monomers m1 and, after attainment of a predetermined conversion, in a second step b), the as yet unconverted side chain-bearing monomers m2 are polymerized together with the ionizable monomers m1. In this way, in a simple and inexpensive manner, a copolymer having a further section B consisting essentially of polymerized side chain-bearing monomers m2 is obtainable.

It is advantageous here to conduct steps a) and b) in immediate succession. In this way, it is possible to maintain the polymerization reaction in steps a) and b) to the best possible degree.

The polymerization in step a) is especially conducted until 0.1-85 mol %, especially 1-74 mol %, preferably 10-70 mol %, in particular 25-70 mol %, especially 28-50 mol % or 30-50 mol %, of the ionizable monomers m1 or of the side chain-bearing monomers m2 have been converted or polymerized. A conversion of 40-45 mol % is particularly advantageous.

The conversion of the monomers m1 and m2 or the progress of the polymerization can be monitored in a manner known per se, for example, with the aid of liquid chromatography, especially high-performance liquid chromatography (HPLC).

More particularly, the ionizable monomers m1 have a structure of the formula IV:

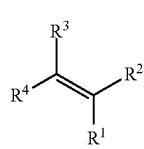

(IV)

and the side chain-bearing monomers m2 have a structure of the formula V:

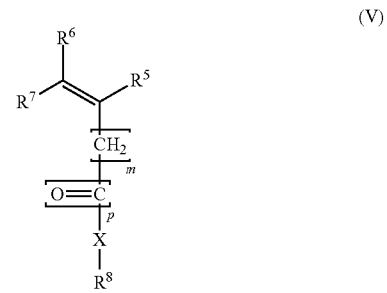

(V)

where $R^1$, $R^2$, $R^3$, $R^4$, $R^5$, $R^6$, $R^7$, $R^8$, m, p and X are defined as described above.

In a further advantageous embodiment characterized, during the polymerization or during step a) and/or during step b), at least one further polymerizable monomer ms is present, which is especially a monomer of the formula VI:

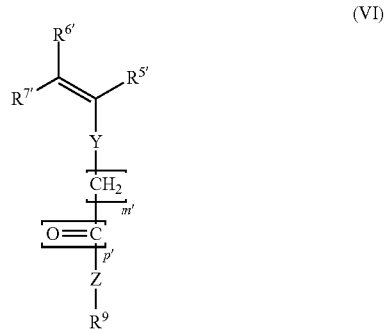

(VI)

where $R^{5'}$, $R^{6'}$, $R^{7'}$, $R^9$ m', p', Y and Z are as defined above.

The further monomer ms, on completion of polymerization, corresponds to the above-described further monomer unit MS.

Particularly advantageously, the at least one further monomer ms is selected from vinyl acetate, styrene, N-vinylpyrrolidone and/or hydroxyalkyl (meth)acrylate, especially hydroxyethyl acrylate.

The process can be conducted, for example, by, in step a), initially charging monomers m2 in a solvent, for example water, and then polymerizing them to give a further section B. As soon as the desired conversion of monomer m2 has been attained (e.g. 30-45 mol %; see above), without a time delay, in step b), monomers m1 are added and the polymerization is continued. The monomers m1 and the as yet unconverted monomers m2 are joined on here to the section B already formed, which forms a the at least one section A having a gradient structure. The polymerization is advantageously again continued until the desired conversion of monomer m1 (e.g. 75-95 mol %, especially 80-92 mol %; see above) has been attained. This affords, for example, a copolymer comprising at least one section A joined to a further section B.

In a further advantageous embodiment, in step a) and/or in step b), there is at least one further polymerizable monomer ms as described above. The at least one further polymerizable monomer ms in this case is especially polymerized together with the monomer m1 and/or the monomer m2.

Alternatively, it is possible, in addition to step a) and step b), to provide a further step c) for polymerization of the at least one further polymerizable monomer ms. In this way, it is possible to prepare a copolymer having an additional section C. More particularly, step c) can be conducted between step a) and step b) in time. Thus, the additional section C is arranged between sections A and B in space.

Alternatively, it is possible to conduct step c) before or after steps a) and b). Thus, the additional section C may be arranged after section A or before section B.

The polymerization is advantageously effected by a controlled free-radical polymerization and/or by a living free-radical polymerization. Particular preference is given to a reversible addition-fragmentation chain transfer polymerization (RAFT).

A free-radical polymerization can basically be divided into three steps: initiation, growth and termination.

"Living free-radical polymerization" is also referred to as "controlled free-radical polymerization" and is known per se to the person skilled in the art in other contexts. The term comprehends chain growth processes in which essentially no chain termination reactions (transfer and termination) take place. Living free-radical polymerization thus proceeds essentially in the absence of irre-versible transfer or termination reactions. These criteria can be fulfilled, for example, when the polymerization initiator is already used up at a very early stage during the polymerization and there is exchange between the species of different reactivity that proceeds at least as rapidly as the chain propagation itself. The number of active chain ends especially remains essentially constant during the polymerization. This enables essentially simultaneous growth of the chains that continues over the entire polymerization process. This correspondingly results in a narrow molecular weight distribution or polydispersity.

In other words, controlled free-radical polymerization or living free-radical polymerization is particularly notable for reversible or even absent termination or transfer reactions. After the initiation, the active sites are accordingly conserved over the entire reaction. All polymer chains are formed (initiated) simultaneously and grow continuously over the entire time. The free-radical func-tionality of the active site is ideally still conserved even after complete conversion of the monomers to be polymerized. This exceptional property of the controlled polymerizations enables preparation of well-defined structures such as gradient or block copolymers through sequential addition of different monomers.

By contrast, in conventional free-radical polymerization as described, for example, in EP 1 110 981 A2 (Kao), all three steps (initiation, growth and termination) proceed in parallel. The lifetime of each of the active, growing chains is very short and the monomer concentration during the chain growth of a chain remains essentially constant. The polymer chains thus formed do not have any active sites suitable for an addition of further monomers. Thus, this mechanism does not permit any control over the structure of the polymers. The preparation of gradient or block structures by means of conventional free-radical polymerization is therefore typically not possible (see, for example, "Polymere: Synthese, Synthese und Eigenschaften" [Polymers: Synthesis, Synthesis and Properties]; authors: Koltzenburg, Maskos, Nuyken; publisher: Springer Spektrum; ISBN: 97-3-642-34772-6 and "Fundamentals of Controlled/living Radical Polymerization"; publisher: Royal Society of Chemistry; editors: Tsarevsky, Sumerlin; ISBN: 978-1-84973-425-7).

Thus, there is a clear distinction of "living free-radical polymerization" from conventional "free-radical polymerization" or free polymerization conducted in a non-living or non-controlled manner.

In reversible addition-fragmentation chain-transfer polymerization (RAFT), control over the polymerization is achieved by a reversible chain transfer reaction. Specifically, a growing free-radical chain adds on what is called a RAFT agent, which leads to formation of an intermediate free radical. The RAFT agent then fragments, in such a way as to reform another RAFT agent and a free radical available for propagation. In this way, the probability of propagation is distributed uniformly over all chains. The average chain length of the polymer formed is proportional to the RAFT agent concentration and to the reaction conversion. RAFT agents used are especially organic sulfur compounds. Particularly suitable are dithioesters, dithiocarbamates, trithiocarbonates and/or xanthates. The polymerization can be initiated in a conventional manner by means of initiators or thermal self-initiation.

Preferably, the polymerization or steps a) and/or b) are effected in an aqueous solution. More particularly, the polymerizations in both steps a) and b) are effected in aqueous solutions. This is also correspondingly true of step c) if it is conducted. As has been found, this has a positive effect on the dispersing action of the copolymer.

Alternatively, it is possible to provide other solvents, for example ethanol.

The initiator used for the polymerization is especially a free-radical initiator, preferably an azo compound and/or a peroxide. Suitable peroxides are selected, for example, from the group consisting of dibenzoyl peroxide (DBPO), di-tert-butyl peroxide and diacetyl peroxide.

A particularly advantageous initiator is an azo compound, for example azobisisobutyronitrile (AIBN), $\alpha,\alpha'$-azodiisobutyramidine dihydrochloride (AAPH) or azobisisobutyramidine (AIBA). Other free-radical initiators, e.g. sodium persulfate or di-tert-butyl hyponitrite, can alternatively be used under some circumstances.

If the polymerization is effected in an aqueous solution or in water, $\alpha,\alpha'$-azodiisobutyramidine dihydrochloride (AAPH) is advantageously used as initiator.

Preferably, during the polymerization or in steps a) and/or b), one or more representatives from the group consisting of dithioesters, dithiocarbamates, trithiocarbonates and xanthates is present. These are called "RAFT agents", and enable control over the polymerization process. This is also correspondingly true of step c) if it is conducted.

More particularly, the polymerization, or step a), step b) and/or step c), is effected at a temperature in the range of 50-95° C., especially 70-90° C.

It is advantageous to work under inert gas atmosphere, for example nitrogen atmosphere.

Correspondingly, the present invention, in a further aspect, also relates to the use of a copolymer obtainable by the process described above as dispersant in a binder composition comprising an alkaline activating agent, the activating agent especially being suitable for activation of a latently hydraulic and/or pozzolanic binder. The binder composition and the activating agent are defined as described above.

A further aspect of the invention relates to a binder composition comprising a mineral binder and an alkaline activating agent, and also a copolymer as defined above.

In addition, there is especially a latently hydraulic and/or pozzolanic binder present in the binder composition. The activating agent is advantageously an activating agent as described above, in particular for latently hydraulic and/or pozzolanic binders. Binder compositions of this kind can be used, for example, together with aggregates such as sand, gravel and/or grades of rocks for the production of mortars and/or concrete.

As has been found, aqueous slurries of such binder compositions have good workability even with a high proportion of latent and/or pozzolanic binders. In addition, adequate early strengths and high strengths after the curing of the binder compositions are achieved.

The mineral binder composition is especially a workable mineral binder composition and/or one which is made up with water.

A weight ratio of water to binder in the mineral binder composition is preferably in the range of 0.25-0.7, particularly 0.26-0.65, preferably 0.27-0.60, especially 0.28-0.55.

The copolymer is advantageously used with a proportion of 0.01-10% by weight, especially 0.1-7% by weight or 0.2-5% by weight, based on the binder content. The proportion of the copolymer is based on the copolymer per se. In the case of a copolymer in the form of a solution, it is the solids content that is correspondingly crucial.

The mineral binder composition is preferably a mortar or concrete composition.

Correspondingly, through curing of such binder compositions, after addition of water, shaped articles are obtainable. These may in principle be of any desired shape and may, for example, be part of a built structure, for example of a building or a bridge.

An additional aspect of the present invention relates to a process for producing a binder composition. This involves mixing a mineral binder which especially comprises a latently hydraulic and/or pozzolanic binder with a copolymer as described above, and an alkaline or basic activating agent, likewise as described above.

In a preferred process, the makeup water for the binder composition is premixed with the activating agent and then the copolymer is mixed in. In a subsequent step, the makeup water comprising the comb polymer and optionally the activating agent is then mixed with the binder. This has been found to be advantageous with regard to maximum efficiency of the copolymer in the binder composition.

In principle, however, it is also possible first to mix the activating agent with the mineral binder, for example with a portion of the makeup water, and subsequently to mix in the copolymer, for example with a further portion of the makeup water.

Moreover, it may be advantageous to mix in a portion of the copolymer, especially all the copolymer, prior to and/or during a process of grinding the mineral binder, for example a hydraulic, latently hydraulic and/or pozzolanic binder.

Independently of this, it may also be preferable to mix in at least a portion of the activating agent, especially all the activating agent, before and/or during a process of grinding the mineral binder. It is optionally possible to add at least some of both the comb polymer and the activating agent before and/or during the grinding process.

These modes of addition can especially simplify handling in the making-up of binder compositions and may have a positive effect on the grinding process.

Further advantageous embodiments of the invention will be apparent from the working examples which follow.

BRIEF DESCRIPTION OF THE DRAWING

The figures used to elucidate the working examples show.

WORKING EXAMPLES

1. Preparation Examples for Polymers
1.1 Reference Polymer R1 (Comparative Example, Statistical Copolymer)

For preparation of a comparative polymer, a reaction vessel is initially charged with 1.4 g of sodium hypophosphite and 36 g of deionized water. The reaction solution is heated to 80° C. To this solution is added dropwise, within 120 min, a solution of 108.3 g of 50% methoxy polyethylene glycol-1000 methacrylate, 8.6 g of methacrylic acid and 20 g of water. At the same time, within 130 min, a solution of 0.89 g of sodium persulfate and 20 g of water is added dropwise.

After this has ended, the solution is cooled down. What remains is a pale yellowish, slightly viscous polymer.

The copolymer thus obtained is referred to as reference polymer R1 and has a purely statistical or random distribution of the monomer units (methacrylic acid units and polyethylene glycol methacrylate units).

1.2 Copolymer P1

For preparation of the gradient polymer by means of RAFT polymerization, a round-bottom flask equipped with a reflux condenser, stirrer system, thermometer and a gas inlet tube is initially charged with 57.4 g of 50% methoxy polyethylene glycol 1000 methacrylate (0.03 mol) and 22 g of deionized water. The reaction mixture is heated to 80° C. with vigorous stirring. A gentle N2 inert gas stream is passed through the solution during the heating and over all the remaining reaction time. 378 mg of 4-cyano-4-(thiobenzoyl) pentanoic acid (1.35 mmol) are then added to the mixture. Once the substance has fully dissolved, 67 mg of AIBN (0.41 mmol) are added. From then on, the conversion is determined regularly by means of HPLC.

As soon as the conversion, based on methoxy polyethylene glycol methacrylate, is 65 mol %, 4.66 g of methacrylic acid (0.05 mol) dissolved in 20 g of $H_2O$ are added dropwise within 20 min. After this has ended, the mixture is left to react for a further 4 h and then to cool. What remains is a clear, pale reddish, aqueous solution having a solids content of around 35%. The copolymer with gradient structure thus obtained is referred to as copolymer P1.

Figure 1:
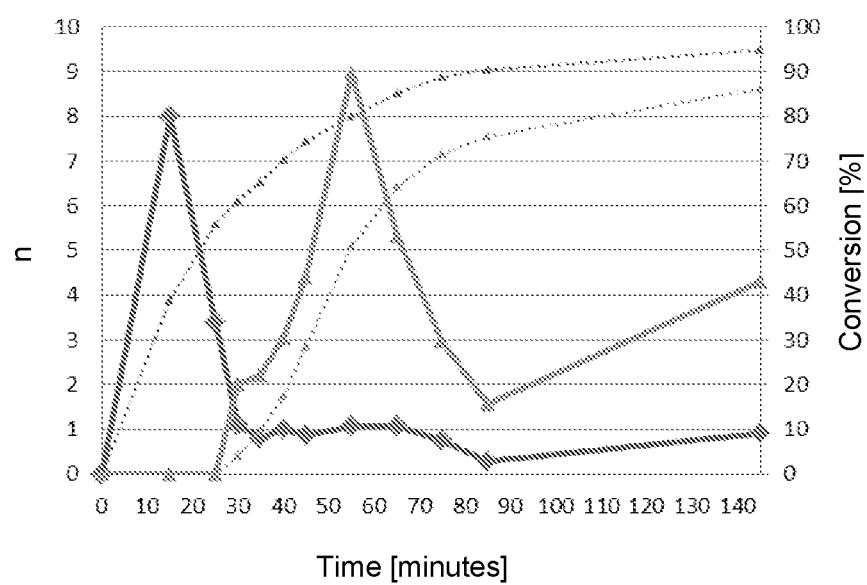
FIG. 1: The plot of the monomer conversions against time in the preparation of a copolymer of the invention (P1)

FIG. 1 shows the plot of the monomer conversions against time in the preparation of the copolymer P1. The monomer conversions were determined in a manner known per se at the times given in FIG. 1 during the preparation of the copolymer by high-performance liquid chromatography (HPLC). The upper dotted curve which begins at the origin at time t=0 minutes represents the percentage conversion of the methoxy polyethylene glycol methacrylate monomers (=side chain-bearing monomers m2) (scale to the right). The lower dotted curve which begins at time t=25 minutes represents the percentage conversion of the methacrylic acid monomers (=ionizable monomers m1) (scale to the right). The solid line with the diamond-shaped points indicates the number of side chain-bearing monomers m2 which have been polymerized since the preceding measurement point (=n(M2); left-hand scale). Correspondingly, the solid line with the triangular points indicates the number of ionizable monomers m1 which have been polymerized since the preceding measurement point (=n(M1); left-hand scale).

Using the data in FIG. 1 for the period from 0 to 55 minutes at the particular time to calculate the ratio n(M2)/[n(M1)+n(M2)] and n(M1)/[n(M1)+n(M2)], the following values are found:

TABLE 1

Monomer ratios during the preparation of the copolymer P1.

| Time | n(M2)/[n(M1) + n(M2)] | n(M1)/[n(M1) + n(M2)] |
|---|---|---|
| 15 | 100% | 0% |
| 25 | 100% | 0% |
| 30 | 33% | 67% |
| 35 | 29% | 71% |
| 40 | 25% | 75% |
| 45 | 17% | 83% |
| 55 | 10% | 90% |

It is apparent from table 1 that, in the preparation of the copolymer P1, during the first 25 minutes, a section consist of 100% side chain-bearing monomer units M2 is formed, followed by a section in which the proportion of side chain-bearing monomer units M2 decreases continuously while the proportion of ionizable monomer units M1 increases continuously.

Figure 2:
FIG. 2: A schematic diagram of a possible structure of a copolymer which can be derived from the conversions according to FIG. 1.

FIG. 2 additionally shows a schematic of a possible structure of the copolymer P1. This can be inferred directly from the conversions shown in FIG. 1. The side chain-bearing monomer units M2 (=polymerized methoxy polyethylene glycol methacrylate monomers) are represented as a circle with a twisted appendage.

The ionizable monomer units M1 are represented as dumbbell-shaped symbols.

It is apparent from FIG. 2 that copolymer P1 comprises a first section A with gradient structure and a further section B consisting essentially of side chain-bearing monomer units.

1.3 Copolymer P2

For preparation of the gradient polymer by means of RAFT polymerization, a round-bottom flask equipped with a reflux condenser, stirrer system, thermometer and a gas inlet tube is initially charged with 57.4 g of 50% methoxy polyethylene glycol 1000 methacrylate (0.03 mol) and 22 g of deionized water. The reaction mixture is heated to 80° C. with vigorous stirring. A gentle N2 inert gas stream is passed through the solution during the heating and over all the remaining reaction time. 378 mg of 4-cyano-4-(thiobenzoyl) pentanoic acid (1.35 mmol) are then added to the mixture. Once the substance has fully dissolved, 67 mg of AIBN (0.41 mmol) are added. From then on, the conversion is determined regularly by means of HPLC.

As soon as the conversion, based on methoxy polyethylene glycol methacrylate, is 65 mol %, 4.66 g of methacrylic acid (0.05 mol) dissolved in 20 g of $H_2O$ are added dropwise within 10 min. After this has ended, the mixture is left to react for a further 4 h and then to cool. What remains is a clear, pale reddish, aqueous solution having a solids content of around 35%. The copolymer with gradient structure thus obtained is referred to as copolymer P2.

1.3 Copolymer P3

For preparation of the gradient polymer by means of RAFT polymerization, a round-bottom flask equipped with a reflux condenser, stirrer system, thermometer and a gas inlet tube is initially charged with 57.4 g of 50% methoxy polyethylene glycol 1000 methacrylate (0.03 mol) and 22 g of deionized water. The reaction mixture is heated to 80° C. with vigorous stirring. A gentle N2 inert gas stream is passed through the solution during the heating and over all the remaining reaction time. 378 mg of 4-cyano-4-(thiobenzoyl) pentanoic acid (1.35 mmol) are then added to the mixture. Once the substance has fully dissolved, 67 mg of AIBN (0.41 mmol) are added. From then on, the conversion is determined regularly by means of HPLC.

As soon as the conversion, based on methoxy polyethylene glycol methacrylate, is 45 mol %, 4.66 g of methacrylic acid (0.05 mol) dissolved in 20 g of $H_2O$ are added dropwise within 20 min. After this has ended, the mixture is left to react for a further 4 h and then to cool. What remains is a clear, pale reddish, aqueous solution having a solids content of around 35%. The copolymer with gradient structure thus obtained is referred to as copolymer P3.

1.4 Copolymer P4

For preparation of the gradient polymer by means of RAFT polymerization, a round-bottom flask equipped with a reflux condenser, stirrer system, thermometer and a gas inlet tube is initially charged with 57.4 g of 50% methoxy polyethylene glycol 1000 methacrylate (0.03 mol) and 22 g of deionized water. The reaction mixture is heated to 80° C. with vigorous stirring. A gentle N2 inert gas stream is passed through the solution during the heating and over all the remaining reaction time. 378 mg of 4-cyano-4-(thiobenzoyl) pentanoic acid (1.35 mmol) are then added to the mixture. Once the substance has fully dissolved, 67 mg of AIBN (0.41 mmol) are added. From then on, the conversion is determined regularly by means of HPLC.

As soon as the conversion, based on methoxy polyethylene glycol methacrylate, is 30 mol %, 4.66 g of methacrylic acid (0.05 mol) dissolved in 20 g of $H_2O$ are added dropwise within 20 min. After this has ended, the mixture is left to react for a further 4 h and then to cool. What remains is a clear, pale reddish, aqueous solution having a solids content of around 35%. The copolymer with gradient structure thus obtained is referred to as copolymer P4.

2. Mortar Mixtures 2.1 Production

The mortar mixture used for test purposes has the dry composition described in table 2:

TABLE 2

Dry composition of mortar mixture

| Component | Amount [g] |
|---|---|
| Cement (CEM I 42.5 N; Normo 4; available from Holcim Schweiz) | 750 g |
| Limestone filler | 141 g |
| Sand 0-1 mm | 738 g |
| Sand 1-4 mm | 1107 g |
| Sand 4-8 mm | 1154 g |

To make up a mortar mixture, the sands, the limestone filler and the cement were dry-mixed in a Hobart mixer for 1 minute. Within 30 seconds, the makeup water (ratio of water to cement w/c=0.49) admixed was added and the mixture was mixed for a further 2.5 minutes. The total wet mixing time was 3 minutes in each case.

Prior to the addition to the mortar mixture, the respective polymer (proportion: 0.24% by weight; based on solids content of the polymer and based on cement content) and optionally a basic activating agent (NaOH; 0.17% by weight based on cement content) were mixed into the makeup water. If both a copolymer and a basic activating agent have been mixed in, the basic activating agent is mixed into the makeup water prior to the addition of the copolymer.

2.2 Mortar Tests

To determine the dispersancy of the polymers, the slump (ABM) of a series of made-up mortar mixtures was measured at different times. The slump (ABM) of the mortar was determined in accordance with EN 1015-3.

2.3 Results of the Mortar Tests

Table 3 gives an overview of the mortar tests conducted and the results achieved. Experiment V1 is a blank experiment conducted for comparative purposes without addition of a polymer.

TABLE 3

Results of mortar tests

| No. | Polymer[+] | Activating agent[*] | ABM[#] [mm] after | | |
|---|---|---|---|---|---|
| | | | 0 min | 30 min | 60 min |
| V1 | — | — | <120 | n.m. | n.m. |
| V2 | R1 | — | 202 | 185 | 176 |
| V3 | R1 | NaOH | 157 (−22%) | 150 (−19%) | 156 (−11%) |
| V4 | P1 | — | 250 | 242 | 239 |
| V5 | P1 | NaOH | 254 (+2%) | 236 (−3%) | 219 (−8%) |
| V6 | P2 | — | 258 | 249 | 229 |
| V7 | P2 | NaOH | 239 (−7%) | 227 (−9%) | 214 (−7%) |
| V8 | P3 | — | 252 | 242 | 220 |
| V9 | P3 | NaOH | 236 (−6%) | 225 (−7%) | 225 (+2%) | n.m. = not measurable
[+]polymer content = 0.24% by weight based on solids content of the polymer and cement content.
[*]content of activating agent = 0.17% by weight based on cement content.
[#]= slump according to EN 1015-3. The time "0 min" corresponds to the first measurement immediately after the making-up of the mortar sample. The percentage in brackets in the experiments with NaOH corresponds to the percentage change in the slump based on the slump of the corresponding experiment without NaOH in the line above.

The experiments show clearly that, in the case of use of copolymers P1-P3 having gradient structure (see experiments V4-V9), the percentage change in the slump owing to the addition of NaOH is clearly smaller than in the case of use of the reference polymer R1 (see experiments V2 and V3).

It can thus be concluded from the results presented that the copolymers of the invention are advantageous over known polymers in various respects. More particularly, with the polymers of the invention, high dispersancies and plasticizations can be achieved, and these can also be maintained at a level of practical interest over a comparatively long period. Moreover, the polymers of the invention are distinctly less susceptible to alkaline activating agents than conventional polymers.

However, the above-described embodiments should be regarded merely as illustrative examples which can be modified as desired within the scope of the invention.

The invention claimed is:

1. A binder composition comprising:
   an organic binder and/or a mineral binder,
   an alkaline activating agent, and
   a copolymer, as dispersant, having a polymer backbone and side chains bonded thereto and comprising:
      at least one ionizable monomer unit M1, and
      at least one side chain-bearing monomer unit M2,
   wherein:
   the copolymer has a gradient structure in at least one section A in a direction along the polymer backbone with regard to the ionizable monomer unit M1 and/or with regard to the side chain-bearing monomer unit M2,
   the copolymer has a further section B, where there is essentially a constant local concentration of monomers and/or a statistical or random distribution of monomers over the entire section B,
   the ionizable monomer unit M1 has a structure represented by formula I:

and the side chain-bearing monomer unit M2 includes a structure represented by formula II:

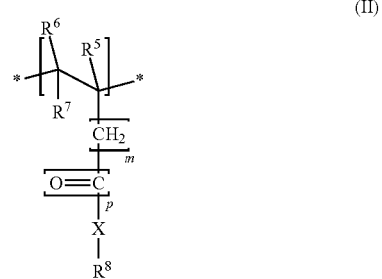

where:
$R^1$, in each case independently, is —COOM, —SO$_2$—OM, —OPO(OM)$_2$, or —PO(OM)$_2$,
$R^2$, $R^3$, $R^5$, and $R^6$, in each case independently, are H or an alkyl group having 1 to 5 carbon atoms,
$R^4$ and $R^7$, in each case independently, are H, —COOM, or an alkyl group having 1 to 5 carbon atoms, or $R^1$ forms a ring together with $R^4$ to give —CO—O—CO—,
M, independently of one another, represents H$^+$, an alkali metal ion, an alkaline earth metal ion, a di- or trivalent metal ion, an ammonium ion, or an organic ammonium group,
m=0, 1, or 2,
p=0 or 1,
X, in each case independently, is —O— or —NH—,
$R^8$ is a group represented by formula -[AO]$_n$—R$^a$, where A is a C$_2$- to C$_4$-alkylene, R$^a$ is H, a C$_1$- to C$_{20}$-alkyl group, a cycloalkyl group, or an alkylaryl group, and n=2-250.

2. The binder composition as claimed in claim 1, wherein the binder comprises a latently hydraulic binder and/or a pozzolanic binder.

3. The binder composition as claimed in claim 1, wherein the binder composition includes 5-95% by weight of a latently hydraulic binder and/or a pozzolanic binder, and 5-95% by weight of a hydraulic binder.

4. The binder composition as claimed in claim 1, wherein, in the at least one section A of the copolymer, a local concentration of the at least one ionizable monomer unit M1 increases continuously along the polymer backbone, while a local concentration of the at least one side chain-bearing monomer unit M2 decreases continuously along the polymer backbone, or vice versa.

5. The binder composition as claimed in claim 1, wherein a polydispersity of the copolymer is <1.5.

6. The binder composition as claimed in claim 1, wherein the at least one section A having the gradient structure has a proportion of at least 30% of monomer units, based on a total number of monomer units in the polymer backbone.

7. The binder composition as claimed in claim 1, wherein:
the further section B comprises ionizable monomer units M1 and/or side chain-bearing monomer units M2.

8. The binder composition as claimed in claim 7, wherein the further section B having the essentially constant local concentration, based on all the monomer units present therein, comprises at least 30 mol % of side chain-bearing monomer units M2, and any proportion of ionizable monomer units M1 present in the further section B is less than 25 mol % based on all the monomer units M2 in the further section B.

9. The binder composition as claimed in claim 1, wherein a molar ratio of the monomer units M1 to the monomer units M2 is in the range of 0.5-6.

10. The binder composition as claimed in claim 1, wherein $R^1$=COOM; $R^2$ and $R^5$, independently of one another, are H, —$CH_3$ or mixtures thereof; $R^3$ and $R^6$, independently of one another, are H or —$CH_3$; $R^4$ and $R^7$, independently of one another, are H or —COOM; and X in at least 75 mol % of all monomer units M2 is —O—.

11. The binder composition as claimed in claim 1, wherein the copolymer is obtainable by a process that includes polymerizing together ionizable monomers m1 and side chain-bearing monomers m2 to form a concentration gradient structure and/or a gradient structure, and the polymerization is effected by a controlled free-radical polymerization and/or a living free-radical polymerization.

12. The binder composition as claimed in claim 1, wherein the mineral binder is present.

13. A process for producing a binder composition as claimed in claim 12, the process comprising mixing the mineral binder, the copolymer, and the alkaline activating agent.

14. A shaped article produced by curing the binder composition as claimed in claim 12 after addition of water.

15. The binder composition according to claim 1, wherein $R^1$, in each case independently, is —COOM or —$SO_2$—OM.

16. The binder composition according to claim 1, wherein $R^1$ is —COOM.

17. The binder composition according to claim 1, wherein the copolymer includes at least 50 mol % of the ionizable monomer units M1 and the side chain-bearing monomer units M2.

18. The binder composition according to claim 1, wherein the copolymer includes at least 75 mol % of the ionizable monomer units M1 and the side chain-bearing monomer units M2.

19. The binder composition according to claim 1, wherein the binder composition includes cement.

20. The binder composition according to claim 1, wherein a proportion of cement in the binder composition is at least 60% by weight.

21. The binder composition according to claim 1, wherein a concentration of the activating agent is 0.1-1.5% by weight based on a weight of the binder.

* * * * *